United States Patent [19]

Liang-Chieh

[11] Patent Number: 5,441,035
[45] Date of Patent: Aug. 15, 1995

[54] BAKE OVEN WITH A BELT CONVEYOR FOR CONVEYING FOODS

[76] Inventor: Lin Liang-Chieh, No. 77, Chung Ming 14th St., Tainan, Taiwan

[21] Appl. No.: 294,573

[22] Filed: Aug. 23, 1994

[51] Int. Cl.⁶ ............................................. A21B 1/42
[52] U.S. Cl. .............................. 126/21 R; 126/41 R; 126/21 A; 99/386; 99/335
[58] Field of Search ............... 126/21 R, 41 R, 39 R, 126/41 B, 41 C; 99/451, 386, 385, 401, 443, 446, 447; 432/120, 140, 147; 219/388, 494, 495, 412, 492

[56] References Cited

U.S. PATENT DOCUMENTS

| | | | |
|---|---|---|---|
| 3,815,489 | 6/1974 | Reid, Jr. et al. | 99/386 X |
| 4,185,546 | 1/1980 | Karpisek | 99/386 |
| 4,951,648 | 8/1990 | Shukla et al. | 126/21 R X |
| 4,960,100 | 10/1990 | Pellicane | 126/21 R X |
| 5,033,366 | 7/1991 | Sullivan | 99/386 X |
| 5,253,564 | 10/1993 | Rosenbrock et al. | 99/386 X |

*Primary Examiner*—Larry Jones
*Attorney, Agent, or Firm*—Morton J. Rosenberg; David I. Klein

[57] ABSTRACT

A bake oven comprising a base frame, a motor-driven belt conveyer disposed above the horizontal bottom wall of the base frame and controlled to carry foods through the baking area, an electric heating coil extended from the base frame and inserted into the belt conveyer and controlled to heat foods on the belt conveyer from the bottom, a gas infrared heater spaced above the belt conveyer and controlled to produce gas infrared rays for heating foods on the belt conveyer from the top, and an electric control box mounted on the base frame at one lateral side for controlling the operation of the belt conveyer, the gas infrared heater and the electric heating coil.

1 Claim, 2 Drawing Sheets

BAKE OVEN WITH A BELT CONVEYOR FOR CONVEYING FOODS

BACKGROUND OF THE INVENTION

The present invention relates to bake ovens, and more particularly to a bake oven which has a detachably belt conveyer for carrying foods through the baking area for quick baking.

A variety of bake ovens have been disclosed, and have appeared on the market. Conventional bake ovens can be gathered into two groups, namely, the draw plate type bake ovens and the conveyer-type bake ovens. A draw plate type bake oven uses a draw plate for carrying foods in the baking chamber for baking which allows foods to be baked batch by batch only. A conventional conveyer-type bake oven uses a belt conveyer to carry foods through the tunnel chamber of the bake over so that the foods can be continuously placed on the belt conveyer and the foods are baked during their courses in the tunnel chamber. In order to eliminate contamination, the conveyer of a conveyer-type bake oven must be frequently cleaned and washed. However, it is not easy to wash the conveyer of a conveyer-type bake oven because the conveyer cannot be easily dismantled.

SUMMARY OF THE INVENTION

The present invention has been accomplished to provide a bake oven with a belt conveyer for conveying foods which eliminates the aforesaid problem. According to one preferred embodiment of the present invention, the bake oven comprises a base frame, a motor-driven belt conveyer disposed above the horizontal bottom wall of the base frame and controlled to carry foods through the baking area, an electric heating coil extended from the base frame and inserted into the belt conveyer and controlled to heat foods on the belt conveyer from the bottom, a gas infrared heater spaced above the belt conveyer and controlled to produce gas infrared rays for heating foods on the belt conveyer from the top, and an electric control box mounted on the base frame at one lateral side for controlling the operation of the belt conveyer, the gas infrared heater and the electric heating coil. The motor-driven belt conveyer comprises a locating frame and two angle bars transversely bilaterally welded to the locating frame at the bottom and respectively fastened to the angle bars on the horizontal bottom wall of the base frame by screws. By loosening the screws, the belt conveyer can be detached from the housing for washing.

DETAILED DESCRIPTION OF THE PREFERRED EMBODIMENT

Figure 1:
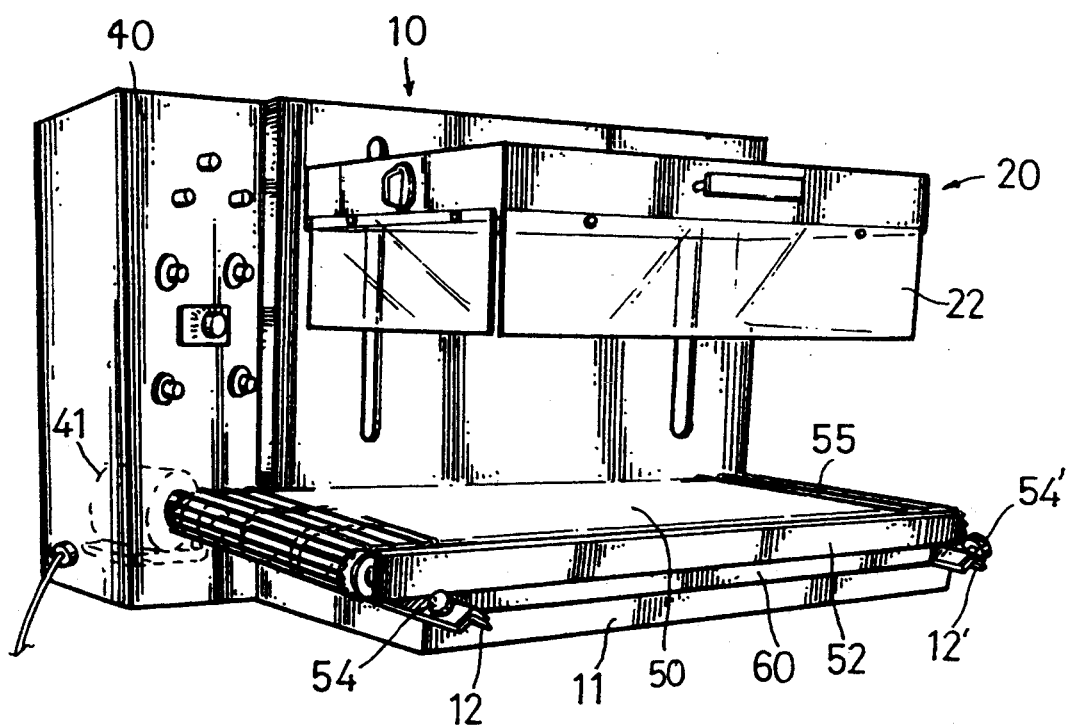
FIG. 1 is a perspective view of a bake oven according to the present invention.
Figure 2:
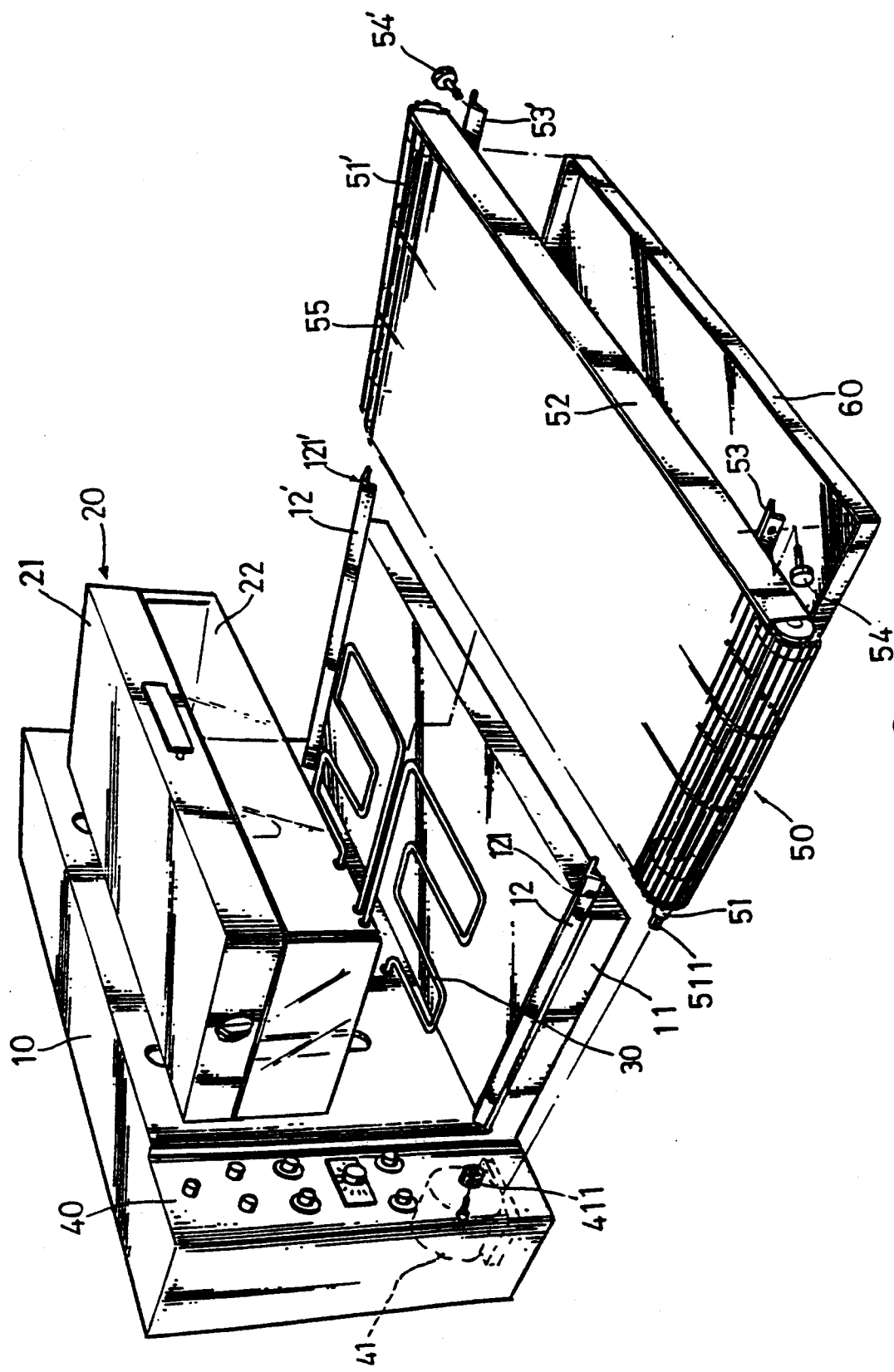
FIG. 2 is similar to FIG. 1 but showing the belt conveyer dismantled.

Referring to FIGS. 1 and 2, the bake oven in accordance with the present invention basically comprises a base frame 10, a gas infrared heater 20, an electric heating coil 30, an electric control box 40, and a belt conveyer 50.

The base frame 10 is a substantially L-shaped frame having a rectangular bottom board 11 horizontally disposed at the bottom. Two angle bars 12 and 12' are transversely bilaterally welded to the rectangular bottom board 11 at the top with the respective angle disposed at the top and spaced above the rectangular bottom board 11, each having a front end with a respective screw hole 121 or 121' projected out of the front side of the rectangular bottom board 11. A tray 60 is mounted on the rectangular bottom board 11 between the angle bars 12 and 12' for collecting food chips fallen from above during baking.

The belt conveyer 50 is disposed above the tray 60, comprising two transmission shafts 51 and 51', a conveying belt 55 mounted around the transmission shafts 51 and 51', a locating frame 52 to hold the transmission shafts 51 and 51', two angle bars 53 and 53' transversely bilaterally welded to the locating frame 52 at the bottom and respectively connected to the screw holes 121 and 121' by screws 54 and 54'.

The electric heating coil 30 extends out of the base frame 10 and is inserted into the space defined within the conveying belt 55 between the transmission shafts 51 and 51'.

The electric control box 40 is mounted on the base frame 10 on the left side at the front, comprising a motor 41 having an axle coupling 411 on the motor shaft thereof. The left-sided transmission shaft 51 of the belt conveyer 50 has a rectangular coupling portion 511 at one end coupled to the axle coupling 411.

The gas infrared heater 20 is a heating device which emits infrared rays by burning fuel gas, comprising a flat, rectangular casing 21 perpendicularly and vertically movably fastened to the base frame 10 and spaced above the belt conveyer 50 and a glass shade 22 downwards extended from the casing 21 around the border. When the gas infrared heater 20 is moved to the lower limit position, the glass shade 22 covers around the heating area.

The conveying speed of the belt conveyer 50 is controlled by controlling the revolving speed of the motor 41. When food is put on the belt conveyer 50 at one end during the operation of the bake oven, it is carried through the heating area between the electric heating coil 30 and the gas infrared heater 20 and is baked quickly.

By loosening the screws 54 and 54', the belt conveyer 50 can be detached from the base frame 10 for washing.

While one preferred embodiment of the present invention has been set forth, alternative embodiment and various modifications will be apparent from the above description to those skilled in the art. These and other alternatives are considered equivalents, and are within the spirit and scope of the present invention.

What is claimed is:

1. A bake oven comprising:

a base frame having a vertical wall and a horizontal wall perpendicularly extended from said vertical wall at the bottom, said horizontal wall having two angle bars transversely bilaterally disposed at the top and a tray mounted on said horizontal wall between said angle bars, each angle bar having the angle disposed at the top and spaced from said horizontal wall;

a tray mounted on said horizontal wall between the angle bars on said horizontal wall;

a belt conveyer disposed above said tray, said belt conveyer comprising a locating frame, two transverse angle bars transversely bilaterally welded to said locating frame at the bottom and respectively fastened to the angle bars on said horizontal wall by screws, two transmission shafts revolvably bilaterally mounted on said locating frame, and a conveying belt mounted around said transmission shafts;

an electric control box mounted on said base frame at one lateral side;

a motor controlled by said electric control box to turn said transmission shafts;

an electric heating coil extended out of said vertical wall of said base frame and horizontally disposed between said transmission shafts within said conveying belt and controlled by said electric control box to produce heat for heating foods on said belt conveyer from the bottom; and a gas infrared heater mounted on said vertical wall of said base frame and controlled by said electric control box to produce infrared rays for heating foods on said belt conveyer from the top, said gas infrared heater comprising a rectangular casing moved along a vertical track on said vertical wall of said base frame and fixed at a desired elevation and a glass shade downwards extended from the rectangular casing around the border and covered around the space defined between the said electric heating coil and the rectangular casing of said gas infrared heater.

* * * * *